Patented Feb. 24, 1931

1,793,935

UNITED STATES PATENT OFFICE

FELIX KAUFLER AND H. GEORG STANGLER, OF MUNICH, GERMANY, ASSIGNORS TO ALEXANDER WACKER GESELLSCHAFT FUR ELECTROCHEMISCHE INDUSTRIE, OF MUNICH, GERMANY

ALCOHOLATE AND METHOD OF MAKING SAME

No Drawing. Application filed April 24, 1930, Serial No. 447,094, and in Germany June 13, 1929.

This invention relates to a process of preparing alcoholates and more particularly to aluminum alcoholates containing metal halides. It is necessary that aluminum alcoholates which are to be used for certain purposes, contain a few percent of a metal halide. This is particularly true where the alcoholate is being used as a catalyst or quasi catalyst in various chemical processes such as in the preparation of ethyl acetate by passing acetaldehyde into a solution of aluminum alcoholate in a solvent having a higher boiling point than acetaldehyde.

Heretofore aluminum alcoholates containing metal halides have been made by using a preformed metal halide, either by reacting aluminum, alcohol, and a metal halide such as aluminum chloride or mercury chloride, or adding the metal halide after formation of the aluminum alcoholate. These alcoholates have also been made by reacting aluminum, alcohol, and iodine. All of these methods are unsatisfactory due to the high cost of the preformed metal halides or iodine.

The use of chlorine, most available and cheapest of the halogens, to supply the halogen for the formation of the metal halide in situ in these compositions has heretofore been considered impractical since it is well known that chlorine will attack alcohol and, also, that aluminum chloride accelerates the chlorination of organic compounds. Likewise, it is known that very considerable amounts of ethyl chloride are formed by the use of anhydrous hydrochloric acid in the presence of aluminum chloride in alcohol solution. Bromine, possessing properties very similar to chlorine, has also not been used for this purpose for the same reasons.

An object of the present invention is to provide a process in which the metal halide can be made readily in situ without formation of wasteful and injurious by-products.

We have now made the unexpected discovery that aluminum alcoholate with the desired content of metal halide can be obtained by treating a mixture of aluminum and alcohol with chlorine or bromine in the presence of an indifferent solvent.

Contrary to the known behavior of these halogens in the presence of organic compounds, in this process they do not combine with the alcohol to form various halogen substitution products, as would be expected, but combine with the aluminum to form aluminum halide, causing the aluminum to rapidly go into solution.

If it is desired to obtain an alcohol free aluminum alcoholate solution, the process may be carried out in the presence of an excess of aluminum or an excess of aluminum may be added during the course of the reaction.

By this process aluminum alcoholates can be obtained having an aluminum chloride or bromide content up to 50% by weight of the aluminum alcoholates although an aluminum halide content up to 15% is sufficient for most purposes.

Ethyl alcohol or its homologues, methyl, propyl, butyl alcohol, etc., may be used as the alcohol in this process. The halogen may be supplied as chlorine gas or chlorine compounds which will give up their chlorine to aluminum such as hydrochloric acid, cupric chloride, hypochlorous acid, chloramine, or as bromine or analogous bromine compounds.

Ethyl acetate is preferred as the indifferent solvent but the following solvents may also be mentioned: methyl acetate, butyl acetate, benzol, toluol, xylol, liquid benzine hydrocarbons.

The product resulting from this process, i. e., an aluminum alcoholate containing an aluminum halide, can be used in many chemical reactions. It is especially effective as a catalyst for the conversion of acetaldehyde to ethyl acetate.

Examples

1. Dry chlorine gas was introduced into a mixture of 200 gms. of dry ethyl acetate and 105 gms. of absolute alcohol containing 25 gms. of aluminum shavings at the boiling point of said mixture (about 70° C.) at such rate that 6 gms. of chlorine were used up after eight hours in the formation aluminum chloride. The resulting product was aluminum ethylate containing aluminum chloride with only traces of chlorine substitution products.

2. 105 gms. of absolute alcohol containing 12 gms. of hydrogen chloride were gradually introduced into a mixture of 25 gms. aluminum and 200 gms. ethyl acetate at a temperature of about 72–78° C. After several hours about 80% of the aluminum had gone into solution giving aluminum ethylate containing aluminum chloride with only the slightest traces of chlorine substitution products.

3. 10 grams of aluminum in granular form were covered with 46 grams of absolute alcohol and 200 grams ethyl acetate and 5 grams of bromine were gradually added to the mixture during 2 hours with stirring. After 3 hours all the aluminum had gone into solution to form aluminum ethylate which contained about 10% of its weight of aluminum bromide.

This process may be carried out at a temperature of 40° C. to 160° C. but the preferred range is 60° C. to 75° C.

In the foregoing examples, the aluminum alcoholate containing aluminum chloride or bromide is obtained in solution. The product may be readily obtained in pure crystalline form by distilling off the solvent, preferably under reduced pressure.

The invention claimed is:

1. Process for the production of aluminum alcoholates containing an aluminum halide comprising treating a mixture of aluminum, an aliphatic alcohol, and an indifferent solvent with an agent selected from the group comprising chlorine, bromine, and chlorine and bromine compounds adapted to give up their halogen content to the aluminum.

2. Process for the production of aluminum alcoholates containing an aluminum halide comprising treating a mixture of aluminum, an aliphatic alcohol, and an indifferent solvent at a temperature of 40–160° C. with an agent selected from the group comprising chlorine, bromine, and chlorine and bromine compounds adapted to give up their halogen content to the aluminum.

3. Process for the production of aluminum alcoholates containing an aluminum halide comprising treating a mixture of aluminum, an aliphatic alcohol, and an indifferent solvent at a temperature of 60–75° C. with an agent selected from the group comprising chlorine, bromine, and chlorine and bromine compounds adapted to give up their halogen content to the aluminum.

4. Process for the production of aluminum alcoholates containing an aluminum halide comprising treating a mixture of aluminum, an aliphatic alcohol, and ethyl acetate at a temperature of 40–160° C. with an agent selected from the group comprising chlorine, bromine, and chlorine and bromine compounds adapted to give up their halogen content to the aluminum.

5. Process for the production of aluminum ethylate containing an aluminum halide comprising treating a mixture of aluminum, ethyl alcohol, and an indifferent solvent at a temperature of 40–160° C. with an agent selected from the group comprising chlorine, bromine, and chlorine and bromine compounds adapted to give up their halogen content to the aluminum.

6. Process for the production of aluminum ethylate containing an aluminum halide comprising treating a mixture of aluminum, ethyl alcohol, and ethyl acetate at a temperature of 40–160° C. with an agent selected from the group comprising chlorine, bromine, and chlorine and bromine compounds adapted to give their halogen content to the aluminum.

7. Process for the production of aluminum alcoholates containing aluminum chloride comprising treating a mixture of aluminum, an aliphatic alcohol, and an indifferent solvent at a temperature of 40° C. to 160° C. with chlorine or a chlorine compound adapted to give up its chlorine content to the aluminum.

8. Process for the production of aluminum alcoholates containing aluminum chloride comprising treating a mixture of aluminum, an aliphatic alcohol, and ethyl acetate at an elevated temperature with chlorine or a chlorine compound adapted to give up its chlorine content to the aluminum.

9. Process for the production of aluminum ethylate containing aluminum chloride comprising treating a mixture of aluminum, ethyl alcohol, and an indifferent solvent at an elevated temperature with chlorine or a chlorine compound adapted to give up its chlorine content to the aluminum.

10. Process for the production of aluminum ethylate containing aluminum chloride comprising treating a mixture of aluminum, ethyl alcohol, and ethyl acetate at a temperature from 40° C. to 160° C. with chlorine or a chlorine compound adapted to give up its chlorine content to the aluminum.

11. Process for the production of aluminum ethylate containing aluminum chloride comprising slowly passing chlorine into a mixture of aluminum, ethyl alcohol, and ethyl acetate at a temperature of approximately 60–75° C.

12. Process for the production of aluminum ethylate containing aluminum chloride comprising slowly adding ethyl alcohol containing hydrogen chloride to a mixture of aluminum and ethyl acetate at a temperature of approximately 60–75° C.

13. Process for the preparation of aluminum alcoholates containing aluminum bromide comprising treating a mixture of aluminum, an aliphatic alcohol, and an indifferent solvent at a temperature of 40–160° C. with bromine or a bromine compound adapted to give up its bromine content to the aluminum.

14. Process for the preparation of aluminum alcoholates containing aluminum bromide comprising treating a mixture of aluminum, ethyl alcohol, and ethyl acetate at a temperature of 40–160° C. with bromine or a bromine compound adapted to give up its bromine content to the aluminum.

Signed at Munich-Bavaria-(Germany) this twelfth day of April, A. D. 1930.

Dr. FELIX KAUFLER.
Dr. H. GEORG STANGLER.